(12) United States Patent
Laor

(10) Patent No.: US 6,584,448 B1
(45) Date of Patent: Jun. 24, 2003

(54) METHOD OF AND SYSTEM FOR DISTRIBUTING AND REDEEMING ELECTRONIC COUPONS

(75) Inventor: Raviv Laor, New York, NY (US)

(73) Assignee: Catalina Marketing International, Inc., St. Petersburg, FL (US)

(*) Notice: Subject to any disclaimer, the term of this patent is extended or adjusted under 35 U.S.C. 154(b) by 0 days.

(21) Appl. No.: 09/437,059

(22) Filed: Nov. 9, 1999

Related U.S. Application Data

(62) Division of application No. 09/160,748, filed on Sep. 25, 1998, now Pat. No. 6,076,069.

(51) Int. Cl.⁷ .................................. G06F 17/60
(52) U.S. Cl. .................. 705/14; 705/26; 705/27; 235/379
(58) Field of Search .................. 705/14, 26, 27; 235/379; 713/201

(56) References Cited

U.S. PATENT DOCUMENTS

| | | | |
|---|---|---|---|
| 3,426,326 A | 2/1969 | Goldstein | |
| 3,737,631 A | 6/1973 | Harris | |
| 3,770,941 A | 11/1973 | Gechele et al. | |
| 3,771,132 A | 11/1973 | Biewer | |
| 3,899,775 A | 8/1975 | Larsen | |
| 3,959,624 A | 5/1976 | Kaslow | |
| 4,002,886 A | 1/1977 | Sundelin | |
| 4,419,573 A | 12/1983 | Von Geldern | |
| 4,554,446 A | 11/1985 | Murphy | |
| 4,674,041 A | 6/1987 | Lemon et al. | 364/401 |
| 4,787,037 A | 11/1988 | Ootsuka | |
| 4,791,281 A | 12/1988 | Johnsen et al. | 235/383 |
| 4,833,308 A | * 5/1989 | Humble | 705/14 |
| 4,843,546 A | 6/1989 | Yoshida et al. | |

(List continued on next page.)

FOREIGN PATENT DOCUMENTS

| | | |
|---|---|---|
| EP | 0 512 509 A2 | 11/1992 |
| WO | WO 93/15466 | 8/1993 |
| WO | WO 94/27231 | 11/1994 |
| WO | WO 95/16971 | 6/1995 |
| WO | WO 97/23838 | 7/1997 |
| WO | WO 99/12115 | 3/1999 |

OTHER PUBLICATIONS

Isabelle "Internet Coupon Drivintg Store Traffic"; Retail Technology Electronic Coupon; Sep. 1997.*

(List continued on next page.)

Assistant Examiner—Romain Jeanty
(74) Attorney, Agent, or Firm—Oblon, Spivak, McClelland, Maier & Neustadt, P.C.

(57) ABSTRACT

An electronic coupon having an associated redemption function for use over a communications channel includes a computer-readable medium associated with a computer processor, the computer-readable medium being encoded with a data structure. The data structure includes data representative of a version number of the electronic coupon, data representative of a party capable of redeeming the electronic coupon, and data representative of a serial number identifying the electronic coupon. The data structure is adapted for providing a benefit in the course of an online transaction based on the redemption function. A method of redeeming an electronic coupon in the course of an online transaction, the electronic coupon including information sufficient for enabling a computer processor unit to electronically redeem the electronic coupon in the course of the online transaction, includes transferring the electronic coupon from a first computer processor unit to a second computer processor unit over a communications channel; transferring the electronic coupon over the communications channel from the second computer processor unit to a further computer processor unit during the online transaction; and the further computer processor unit providing a benefit to the second computer processor unit based on the information in the course of the online transaction.

5 Claims, 2 Drawing Sheets

U.S. PATENT DOCUMENTS

| | | | |
|---|---|---|---|
| 4,882,675 A | 11/1989 | Nichtberger et al. | 364/401 |
| 4,887,208 A | 12/1989 | Schneider et al. | |
| 4,949,256 A | 8/1990 | Humble | |
| 4,972,504 A | 11/1990 | Daniel, Jr. et al. | |
| 5,056,019 A | 10/1991 | Schultz et al. | |
| 5,060,185 A | 10/1991 | Naito et al. | |
| 5,117,355 A | 5/1992 | McCarthy | 364/405 |
| 5,119,294 A | 6/1992 | Tanaka | |
| 5,128,752 A * | 7/1992 | Von Kohorn | 705/14 |
| 5,128,861 A | 7/1992 | Kagami et al. | |
| 5,168,445 A | 12/1992 | Kawashima et al. | |
| 5,173,851 A * | 12/1992 | Off et al. | 705/14 |
| 5,185,695 A * | 2/1993 | Pruchnicki | 705/14 |
| 5,193,056 A | 3/1993 | Boes | 364/408 |
| 5,202,826 A | 4/1993 | McCarthy | 364/405 |
| 5,227,874 A | 7/1993 | Von Kohorn | |
| 5,237,496 A | 8/1993 | Kagami et al. | |
| 5,237,499 A | 8/1993 | Garback | 364/407 |
| 5,245,533 A | 9/1993 | Marshall | |
| 5,249,044 A | 9/1993 | Von Kohorn | 358/86 |
| 5,256,863 A | 10/1993 | Ferguson et al. | |
| 5,285,278 A | 2/1994 | Holman | |
| 5,287,181 A | 2/1994 | Holman | |
| 5,287,268 A | 2/1994 | McCarthy | 364/405 |
| 5,305,195 A | 4/1994 | Murphy | 364/401 |
| 5,305,197 A | 4/1994 | Axler et al. | 364/401 |
| 5,305,199 A | 4/1994 | LoBiondo et al. | |
| 5,315,093 A | 5/1994 | Stewart | |
| 5,331,544 A | 7/1994 | Lu et al. | |
| 5,337,253 A | 8/1994 | Berkovsky et al. | |
| 5,347,632 A | 9/1994 | Filepp et al. | |
| 5,353,218 A | 10/1994 | De Lapa et al. | 364/401 |
| 5,367,452 A | 11/1994 | Gallery et al. | |
| 5,368,129 A | 11/1994 | Von Kohorn | |
| 5,377,095 A | 12/1994 | Maeda et al. | |
| 5,380,991 A | 1/1995 | Valencia et al. | 235/383 |
| 5,396,417 A | 3/1995 | Burks et al. | |
| 5,401,946 A | 3/1995 | Weinblatt | |
| RE34,915 E | 4/1995 | Nichtberger et al. | 364/401 |
| 5,406,475 A | 4/1995 | Kouchi et al. | |
| 5,420,606 A | 5/1995 | Begum et al. | 345/156 |
| 5,448,471 A | 9/1995 | Deaton et al. | |
| 5,459,306 A | 10/1995 | Stein et al. | |
| 5,483,049 A * | 1/1996 | Schultze, Jr. | 705/14 |
| 5,502,636 A | 3/1996 | Clarke | 364/401 |
| 5,515,098 A | 5/1996 | Carles | 348/8 |
| 5,557,518 A | 9/1996 | Rosen | 364/408 |
| 5,557,721 A | 9/1996 | Fite et al. | 705/14 |
| 5,572,643 A | 11/1996 | Judson | |
| 5,612,868 A | 3/1997 | Off et al. | 364/214 |
| 5,621,812 A | 4/1997 | Deaton | |
| 5,644,723 A | 7/1997 | Deaton | |
| 5,649,114 A | 7/1997 | Deaton | |
| 5,687,322 A | 11/1997 | Deaton | |
| 5,701,451 A | 12/1997 | Rogers et al. | |
| 5,706,507 A | 1/1998 | Schloss | |
| 5,708,782 A | 1/1998 | Larson et al. | 705/14 |
| 5,710,886 A * | 1/1998 | Christensen et al. | 705/14 |
| 5,712,979 A | 1/1998 | Graber et al. | |
| 5,715,399 A | 2/1998 | Bezos | |
| 5,717,860 A | 2/1998 | Graber et al. | |
| 5,740,549 A | 4/1998 | Reilly et al. | |
| 5,752,246 A | 5/1998 | Rogers et al. | |
| 5,754,939 A | 5/1998 | Herz et al. | |
| 5,761,648 A | 6/1998 | Golden et al. | 705/14 |
| 5,774,868 A | 6/1998 | Cragun et al. | |
| 5,794,207 A | 8/1998 | Walker et al. | 705/23 |
| 5,806,044 A | 9/1998 | Powell | 705/14 |
| 5,806,045 A * | 9/1998 | Biorge et al. | 235/380 |
| 5,812,769 A | 9/1998 | Graber et al. | |
| 5,822,735 A | 10/1998 | DeLapa | |
| 5,832,457 A | 11/1998 | O'Brien et al. | |
| 5,845,259 A | 12/1998 | West et al. | |
| 5,848,396 A | 12/1998 | Gerace | |
| 5,855,007 A * | 12/1998 | Jocivic et al. | 705/14 |
| 5,857,175 A | 1/1999 | Day et al. | |
| 5,878,222 A | 3/1999 | Harrison | |
| 5,884,278 A | 3/1999 | Powell | 705/14 |
| 5,887,271 A | 3/1999 | Powell | |
| 5,890,137 A | 3/1999 | Koreeda | |
| 5,903,874 A * | 5/1999 | Leonard et al. | 705/14 |
| 5,905,246 A | 5/1999 | Fajkowski | 235/375 |
| 5,907,830 A * | 5/1999 | Engle et al. | 705/14 |
| 5,909,673 A | 6/1999 | Gregory | 705/45 |
| 5,916,024 A | 6/1999 | Von Kohorn | |
| 5,918,213 A | 6/1999 | Bernard et al. | |
| 5,924,080 A * | 7/1999 | Johnson | 235/380 |
| 5,926,795 A | 7/1999 | Williams | |
| 5,933,811 A | 8/1999 | Angles | |
| 5,943,653 A * | 8/1999 | Ross et al. | 705/14 |
| 5,948,061 A | 9/1999 | Merriman et al. | |
| 5,950,173 A | 9/1999 | Perkowski | |
| 5,956,027 A | 9/1999 | Krishnamurthy | |
| 5,970,469 A | 10/1999 | Scroggie et al. | 705/14 |
| 5,974,399 A | 10/1999 | Giuliani et al. | |
| 5,978,013 A * | 11/1999 | Jones et al. | 348/10 |
| 6,002,771 A * | 12/1999 | Nielsen | 380/30 |
| 6,006,197 A | 12/1999 | D'Eon | |
| 6,009,411 A | 12/1999 | Kepecs | |
| 6,012,038 A * | 1/2000 | Powell | 705/14 |
| 6,014,634 A | 1/2000 | Scroggie et al. | |
| 6,021,362 A | 2/2000 | Maggard et al. | |
| 6,026,370 A | 2/2000 | Jermyn | |
| 6,039,244 A | 3/2000 | Finsterwald | |
| 6,041,308 A | 3/2000 | Walker et al. | |
| 6,041,309 A | 3/2000 | Laor | |
| 6,049,778 A | 4/2000 | Walker et al. | |
| 6,055,513 A | 4/2000 | Katz et al. | |
| 6,061,660 A | 5/2000 | Eggleston et al. | |
| 6,073,105 A | 6/2000 | Sutcliffe et al. | |
| 6,075,971 A * | 6/2000 | Williams et al. | 455/5.1 |
| 6,076,069 A | 6/2000 | Laor | |
| 6,141,010 A | 10/2000 | Hoyle | |
| 6,230,143 B1 | 5/2001 | Simons et al. | |
| 6,266,649 B1 | 7/2001 | Linden et al. | |
| 6,279,112 B1 * | 8/2001 | O'Toole et al. | 705/14 |

OTHER PUBLICATIONS

Carol " ECR as Efficient Coupon Redemption"; SuperMarket Business, Feb. 1997.*

Jun. 15, 1989, "In this Computer Age, Who Needs Coupons?" The New York Times.

Dec. 1992, "Interactive Cable System Receives Strong Response" Direct Marketing, pp. 9–10.

May 9, 1994, "SLED Internet Directory Distributes Electronic Coupons" PR Newswire.

May 16, 1994 "SLED InterNIC Debut Internet Services" PC Week p. 130.

May 1994, David Bank "Email Marketing Firm Using Discount Strategy" San Jose Mercury News.

Sep. 25, 1995, Kelly Shermach "Electronic Coupon Program Offers Database Potential" Marketing News.

Dec. 8, 1995, H.G. Lewis "Cruising Down the Hype–er Space Road: How to Write Copy for the (GULP!) Internet" Direct Marketing, vol. 58 No. 8, pp. 14–15.

Feb. 11, 1996, Catalina Marketing Online Launch to Include More than 1,600 California Stores Catalina Marketing Corporation Newsletter.

Apr. 19, 1996, "San Jose Customers Can Now Plan Supermarket Shopping in Cyberspace—New Internet Service Saves Shoppers Time and Money" Catalina Marketing Corporation Newsletter.

Apr. 19, 1996, "Cruising for Food Savings on the Internet" San Diego Union–Tribune, p. C1.

Jun. 1, 1996, Laurie Peterson, "Click Here for Coupons" Direct p. 45.

Jun. 13, 1996, "PNC Bank Announces Internet Site, Plans Comprehensive Service Expansion" Business Wire.

Nov. 4, 1996, John Fontant "$2^{nd}$ Net Bank Opens for Business" Communicationsweek p. 46.

Apr. 1997, R. Resnick, "The Case for 'Opt In' Marketing on the Internet" Direct Marketing, vol. 59, No. 12 pp. 52–53.

Aug. 5, 1997, "Internet Coupon Security Breakthrough Removes Major Obstacle to Online Packaged Goods Advertising" SuperMarkets Online.

Dec. 1, 1997, "Internet and Food Industries Embrace Secure Online Coupon Format" SuperMarkets Online.

Sep. 30, 1998, "IntelliQuest and Coolsavings Offer Innovative Online Customer Relationship Management Program for Technology Vendors" Business Wire.

Oct. 20, 1998, "IntelliQuest Looks for Interaction with Loyalty, Web Traffic Programs" Electronic Advertising & Marketplace Report.

Mar. 1999, www.freesamples.com. Reprinted on Oct. 3, 2001, by Rebecca Brimmer, since the original copy could not be found.

Carlene A. Thissen, "Clearing Up Questions in Coupons Clearing".

International Search Report for PCT/US96/20497, International Filing Date Dec. 23, 1996, Priority Date Dec. 26, 1995.

International Search Report for PCT/US01/19204, International Filing Date Jun. 15, 2001, Priority Date Jun. 19, 2000.

* cited by examiner

*Primary Examiner*—Tariq R. Hafiz

METHOD OF AND SYSTEM FOR DISTRIBUTING AND REDEEMING ELECTRONIC COUPONS

CROSS-REFERENCE TO RELATED APPLICATIONS

The present divisional application is based on, and claims benefit of, parent application, U.S. Ser. No. 09/160,748, filed Sep. 25, 1998, now U.S. Pat. No. 6,076,069.

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to a method of and system for distributing and redeeming electronic coupons or "tokens" in a computer network environment and more specifically to a method and system for distributing, in advance of a request for information for which the "token" has relevance which may be redeemed.

With the rapid growth of computer networking and requests for information from one computer to the next e.g. the Internet, it has become common practice for a provider of information (a "Server") to provide each specific requester of information (a "Client"), with an electronic "token" (commonly referred to as a "Cookie") for the purpose of "recognizing" the client and/or providing some pre-determined and pre-programmed level of customization at the discretion of the information provider.

Thus, in the prior art, the first time a client makes an electronic request for information from the server, the server delivers the requested information and, in addition, an electronic "token" or Cookie that allows the "server" to recognize the "client" and is able to customize the information provided in subsequent requests. The Cookie can also be used to identify a specific client or set of clients to control access to specific information or entry points of the server's private network.

In ordinary commerce, information providers such as newspapers and magazines are used to attract or identify specific market segments of consumers in order to permit vendors to target consumers in those specific market segments with advertising. This frequently includes the use of coupons which may be redeemed by consumers for discounts on product purchases and for other benefits. Typically, the source of the coupon is either the vendor's own product or publication or that of a distributor or other information provider associated with the vendor. One of the benefits of coupons is that they provide the vendor with some measure of the effectiveness of their advertising by using coupons that are unique to each source of advertising. However, the tracking of paper coupons is a very time consuming and imprecise process.

With the advance of the Internet, consumers can download and print out coupons from many online sources. Consumers can take these coupons to their local store to redeem them or return them to their source along with a proof of purchase in order to receive a refund by mail. These methods are both inconvenient and time consuming for the consumer. Currently, there is no effective way to distribute and redeem coupons online.

Accordingly, it is an object of this invention to provide an improved method and system for distributing and redeeming coupons in a network environment.

SUMMARY OF THE INVENTION

The invention is directed to a method of and system for distributing and redeeming electronic coupons in a networked environment where the source of the coupons, the consumer and vendor are all connected to a common communications channel. The consumer, via a client system, can connect to a source of the coupons, typically a server, which will transfer an electronic coupon or a "book" of electronic coupons to the client. These coupons are transferred in advance of the client establishing a connection with the vendor's server in order to request information or obtain discounts on purchases of the vendors products or services. When the client does establish a connection with a vendor's server and initiates a transaction for information, goods or services, the vendor's server can recognize that the client bears a coupon which can modify the transaction and permit the client to redeem the coupon. The coupon can include an encrypted or encoded portion which would permit the server to communicate with another server such as an authentication server to authenticate and/or validate the coupon.

The system according to the invention includes a first server system, including a computer processor and associated memory and a client system, including a computer processor and associated memory, coupled to a communications channel. The client system is adapted to request information from the first server system and the first server system is adapted for transferring information over the communications channel. The first server system is also adapted for transferring an electronic coupon to client system and the client system is adapted for storing the electronic coupon in the associated memory. The system can further include a second server system, including a computer processor and associated memory, coupled to the communications channel. The client can be adapted to initiate a transaction with the second server system. The second server system can be adapted to detect the electronic coupon in order to enable or modify the nature or value of the transaction. The system can further include a third server system, including a computer processor and associated memory, .which can be coupled to the communications channel. The second server system can establish a connection with the third server system in order to enable the third server system to authenticate the electronic coupon and authorize the completion of the transaction contemplated.

The method according to the invention includes the steps of a client system requesting information from a first server system. The first server system transfers the requested information and includes an electronic coupon along with the information transferred. The client system stores the electronic coupon in memory. The client system subsequently requests information from a subsequent server system. The subsequent server system can detect that the client system holds the electronic coupon and upon initiation of a transaction with the subsequent server system, the subsequent server system can enable or modify the transaction, such as by providing a discount in the purchase price of goods or services or provide access or a modified level of access to the information requested as a function of the electronic coupon.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention is directed to a method of and system for distributing and redeeming electronic coupons. An electronic coupon is essentially a token, issued by or under the authority of the issuer for the benefit of recipient. Typically, the recipient receives the electronic coupon and subsequently redeems it for the prescribed benefit at some later point in time. Preferably, the electronic coupon enables or modifies an anticipated transaction such as providing a discount in the price of goods or services provided by the issuer or the issuer's agent. In addition, the electronic coupon can enable or modify the level of access to privately held information or a server having restricted access. Alternatively, the electronic coupon can be used in transactions between two businesses, two government agencies or two governments wherein, for example, the businesses enter into an agreement relating to a transaction for goods or services or access to information, or the governmental bodies enter into an agreement relating to transactions regarding currency or information.

Figure 1:
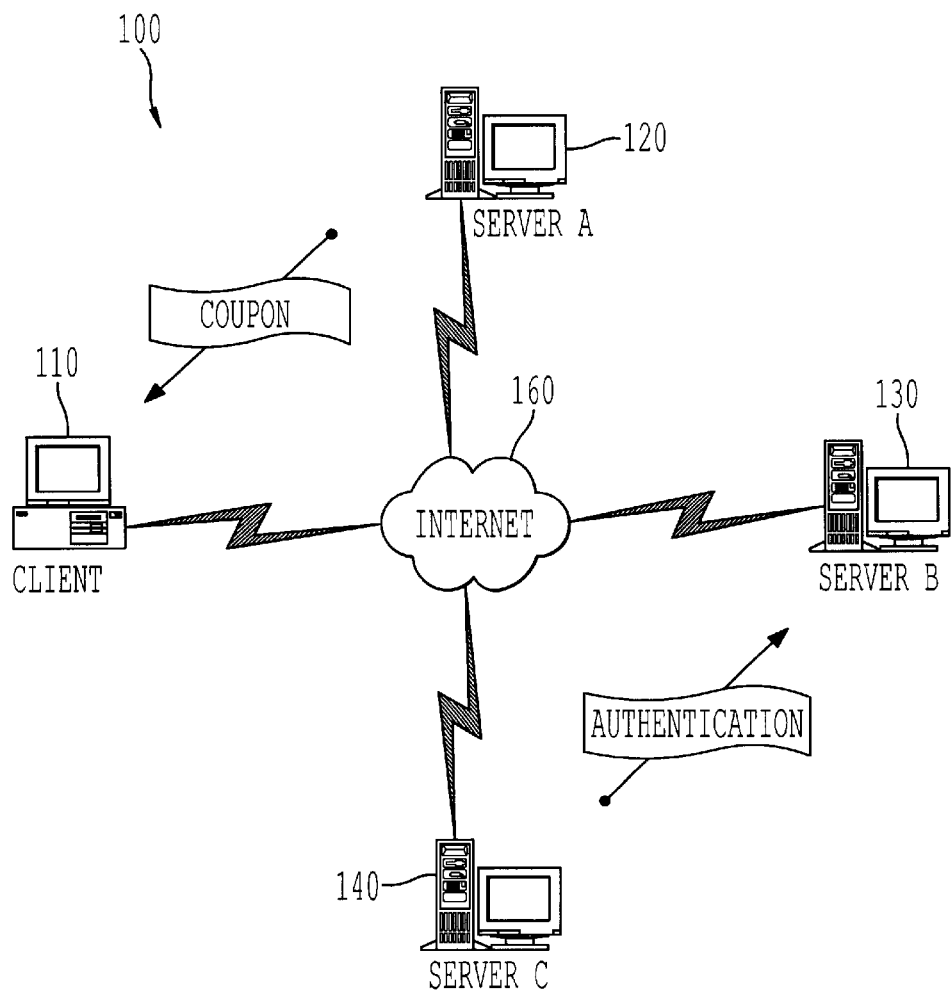
FIG. 1 is a diagrammatic view of a system for distributing and redeeming electronic coupons in accordance with the present invention.

FIG. 1 shows a diagram of a system 100 for distributing and redeeming electronic coupons in accordance with a preferred embodiment of the present invention. The system 100 includes Client system 110, Server System A 120, Server System B 130, and Server System C 140, all connected to a common communications channel 160. Preferably, the Client system 110, Server System A 120, Server System B 130, and Server System C 140 can be a personal computer such as an IBM PC or IBM PC compatible system or an APPLE MacINTOSH system or a more advanced computer system such as an Alpha based computer system available from the Digital Equipment Corporation division of Compaq Computer Corporation or SPARC Station computer system available from SUN Microsystems Corp, although a main frame computer system can also be used. Preferably, the communications channel 160 is a TCP/IP based network such as the Internet or an intranet, although almost any well known LAN, WAN, VPN technology can be used.

In one preferred embodiment of the invention, the Client system 110 is an IBM PC compatible operating the Microsoft Windows 95 or 98 operating system and Server System A 120, Server System B 130, and Server System C 140 are configured as Web Servers providing access to information such as web pages in HTML format via the HyperText Transport Protocol (http). Server System A 120 is also configured to generate cookies and to transfer the cookies to the Client System 110. The Client system 110 includes software to allow viewing of web pages, commonly referred to as a Web Browser, such as Communicator available from Netscape Communications Corp. or Internet Explorer available from Microsoft Corp. The Client system 110 is capable of accessing web pages located on Server System A 120 and Server System B 130. Server System C 140 is an authentication server which includes the software necessary to authenticate electronic coupons prior to their redemption.

In one preferred embodiment, Service System A 120 includes web server software that is adapted to produce an electronic coupon or a book of electronic coupons that is transferred to the Client system 110 in the form of a Cookie that is stored in memory at the Client system. Preferably, the electronic coupon is a data structure which can include any or all of the following information elements: data representative of an electronic coupon serial number or identification number, data representative of a unique key that can be used to validate or authenticate the coupon, data representative of the vendor that authorized the coupon and will redeem the coupon, data representative of the nature of the discount or access provided by the coupon, data representative of the server or entity that issued the coupon. In one preferred embodiment, the electronic coupon can be issued as part of an electronic coupon book. The coupon book can include data representative of a version number for the electronic coupon book and data representative of a serial number or identification number for the electronic coupon book.

In one preferred embodiment, the electronic coupon contains all the information necessary to redeem the coupon. Specifically, the electronic coupon identifies the grantor (i.e. the party or vendor that will redeem the electronic coupon), the nature of the discount or benefit provided and a unique serial number or other data structure that permits the electronic coupon to be authenticated or validated. Thus, a server redeeming this type of electronic coupon can obtain all the information necessary to redeem from the electronic coupon. The server can even include the software necessary to authenticate or validate the electronic coupon.

In an alternative embodiment, the electronic coupon book includes a unique serial number or identification number and a data structure useful for authenticating or validating the electronic coupon book. The actual content of the electronic coupon book can be determined, for example, by visiting a website which reads the coupon book serial number and provides the user with listing of the coupons available. The benefit to this configuration is the organization that issues the electronic coupon book can add vendors even after the electronic coupon book has been issued. Thus, if a vendor signs up with the organization that issues electronic coupon books after a particular coupon book has been issued to a client, the vendor can be added to the electronic coupon book at a later date. In order to redeem this type of electronic coupon, the server which intends to redeem the electronic coupon must connect to an authentication server which will authenticate or validate the coupon book and indicate the nature of the benefit of the electronic coupon to the server requesting authentication/validation.

Figure 2:
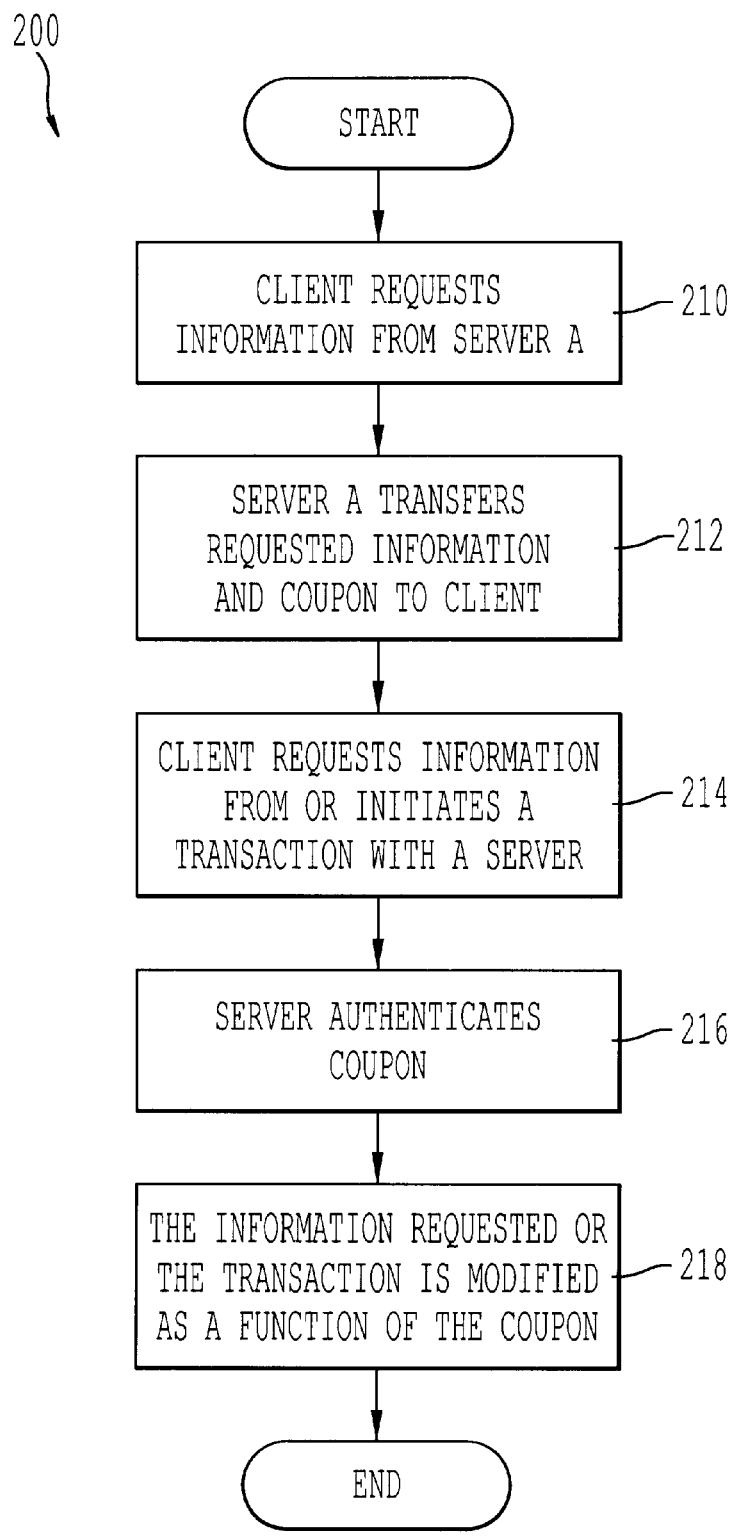
FIG. 2 is a flow diagram of a method of distributing and redeeming electronic coupons in accordance with the present invention.

FIG. 2 shows a flow chart 200 of a method of distributing and redeeming coupons in accordance with one preferred embodiment of the invention. In a preliminary step 210, the client system requests information from Server A. In the next step 212, Server A transfers the requested information along with the electronic coupon to the Client system. The Client system stores the electronic coupon in memory. In the next step 214, the Client system initiates a transaction or requests information from a Server. The Server could be Server A or another server. At this point, depending upon the system, the Server could detect the presence of the electronic coupon on the Client system or the Client system could present the electronic coupon for redemption. In the next step 216, the Server authenticates the electronic coupon. Depending upon the system, the Server could evaluate the electronic coupon to authenticate or validate the electronic coupon, or alternatively, the Server could transfer the electronic coupon information to an Authentication Server which could authenticate or validate the electronic coupon and authorize the transaction. In the next step 218, the electronic coupon is used to modify or enable the transaction and the transaction is completed.

As one of ordinary skill will appreciate, it will not always be necessary for the Client system to request information from Server A. All that is necessary is for Server A to establish a connection with the Client system in order to transfer the electronic coupon to the Client system. One method of transferring the electronic coupon is to include the electronic coupon with the information requested. Alternatively, the electronic coupon can be transferred to the Client system by any method of transferring information.

In a preferred embodiment of the invention, the Client system is a personal computer running browser software which connects to web servers via the Internet or a similar network. Preferably, a book of electronic coupons is transferred to the Client system in the form of a Cookie which is stored in memory at the Client system. The Cookie can be detected by any subsequent web server that Client system connects to. If the Client system attempts to initiate a transaction with a particular web server, the web server detects the Cookie which includes electronic coupon and uses the electronic coupon to enable or modify the transaction. In this embodiment, when the Client system receives the electronic coupon, the user can be alerted to the presence of the electronic coupon by another browser window or a java based window that identifies all the electronic coupons in the electronic coupon book, the nature of the benefit provided and provides links to the various web sites where the electronic coupons can be redeemed. Alternatively, the Client system can connect to a web server which displays the contents of the electronic coupon book in the form of a web page which describes the nature of the electronic coupon benefit and a link to the web page where the electronic coupon can be redeemed.

As one having ordinary skill in the art will appreciate, the use of the client system will typically be operated or otherwise controlled by a consumer or a customer (in business to business transactions) and the server system or systems will be operated or otherwise controlled by an organization or an agent of an organization authorized to enter into and complete the transaction. In addition, as one having ordinary skill will appreciate the entire process and system can be automated, for example whereby a client system is programmed to periodically visit websites (whether or not known to the source of electronic coupons) or the originating server can be programmed to periodically distribute electronic coupons, such as by electronic mail, and the redeeming server can be programmed to automatically redeem the electronic coupon as part of an automated request to initiate a transaction received from an automated client system. One of ordinary skill in the art will also appreciate that the electronic coupons can include an expiration date or a window of dates when the electronic coupon is valid or effective.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of redeeming an electronic coupon in the course of an online transaction, said electronic coupon having a data structure resident in a computer-readable medium of a first computer processor unit, said data structure being transferable between computer-readable media of a plurality of computer processor units over a communications channel and including information sufficient for enabling one of said computer processor units to electronically redeem said electronic coupon in the course of said online transaction, the method comprising:

A. establishing a connection between said first computer processor unit and a second computer processor unit;

B. transferring said data structure resident in said computer-readable medium of said first computer processor unit to a computer-readable medium of said second computer processor unit over said communications channel;

C. establishing a connection between said second computer processor unit and a further computer processor unit for the purpose of initiating said online transaction;

D. in response to establishing a connection between said second computer processor unit and a further computer processor unit, said further computer processor unit detecting said data structure in said computer-readable medium of said second computer processor unit;

E. automatically transferring said data structure information over said communications channel from said second computer processor unit to said further computer processor unit during said online transaction; and F. said further computer processor unit providing a benefit to said second computer processor unit based on said data structure information in the course of said online transaction.

2. The method according to claim 1, further including the step of authenticating said electronic coupon as a function of said information, so as to prevent the use of a counterfeit coupon by said second computer processor unit.

3. The method according to claim 1, further including the step of said further computer processor unit recovering a value corresponding to said benefit from said first computer processor unit.

4. The method according to claim 1, further including the step of said further computer processor unit electronically recovering a value corresponding to said benefit from said first computer processor unit, as a function of said information.

5. The method of claim 1, wherein said first computer processor unit and said further computer processor unit are the same computer processor unit.

* * * * *

UNITED STATES PATENT AND TRADEMARK OFFICE
CERTIFICATE OF CORRECTION

PATENT NO. : 6,584,448 B1
DATED : June 24, 2003
INVENTOR(S) : Laor

It is certified that error appears in the above-identified patent and that said Letters Patent is hereby corrected as shown below:

<u>Title page</u>,
Item [45] and Item [*] should read as follows:
-- [45] Date of Patent: *Jun. 24, 2003

[*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer --

Signed and Sealed this

Sixth Day of July, 2004

JON W. DUDAS
*Acting Director of the United States Patent and Trademark Office*